United States Patent [19]

Goebel et al.

[11] Patent Number: 5,296,943
[45] Date of Patent: Mar. 22, 1994

[54] MULTI-PATH ELECTRONIC CAMERA ASSEMBLY

[75] Inventors: Grant D. Goebel; Norman C. Discher; Collin M. Campbell, all of Rochester, N.Y.

[73] Assignee: Eastman Kodak Company, Rochester, N.Y.

[21] Appl. No.: 814,025

[22] Filed: Dec. 26, 1991

[51] Int. Cl.⁵ .............................................. H04N 1/04
[52] U.S. Cl. ................................... 358/471; 358/474; 358/909.1
[58] Field of Search ............... 358/471, 474, 401, 909, 358/108, 226; 359/210, 211, 212, 213, 214, 215, 216, 808, 821; 250/234, 235, 236

[56] References Cited

U.S. PATENT DOCUMENTS

| 4,044,384 | 8/1977 | Imokuchi | 358/293 |
| 4,656,524 | 4/1987 | Norris et al. | 358/401 |
| 4,701,809 | 10/1987 | Barrett | 358/494 |
| 4,760,451 | 7/1988 | Gremier et al. | 358/213.13 |
| 5,010,366 | 4/1991 | Baxter | 355/240 |
| 5,028,994 | 7/1991 | Miyakawa | 358/92 |
| 5,032,868 | 7/1991 | Nishino et al. | 355/202 |

Primary Examiner—Sr. Coles
Assistant Examiner—Thomas D. Lee
Attorney, Agent, or Firm—J. Gary Mohr

[57] ABSTRACT

An apparatus, such as an electronic scanning camera, for use in conjunction with an electrophotographic reproduction device, such as a copier, recorder or printer, is provided for making reproductions of images from at least two separate and distinct image informational light paths. The light projected or reflected, from said paths, is received by an appropriate lens system, of the electronic scanning camera, for directing the light to a common image pickup member, such as a charge-coupled device. A pivotal mirror located within the electronic scanning camera has a first position removed from at least a first path. In a second position, the mirror is pivoted such that image light transmitted along a path, other than the first path, is directed, by reflection from the mirror, to the charge-coupled device. In this second position, the back of the mirror blocks light, thereby preventing light transmitted from all but the path which the mirror is reflecting, from impacting on the charge-coupled device.

13 Claims, 4 Drawing Sheets

MULTI-PATH ELECTRONIC CAMERA ASSEMBLY

BACKGROUND OF THE INVENTION

There are presently known, as indicated by U.S. Pat. Nos. 5,032,868 and 5,010,366, methods for reproducing slides transparencies, microfilm, images projected onto a board surface and conventional documents. These methods, however, do not have dedicated optical systems for each type of reproduction being performed. Therefore, components used in an optical system for one type of reproduction must also be used for another type of reproduction. Without dedicated optical systems for each type of reproduction, the shared optical components for directing light from the image to be reproduced, be it projected or reflected, cannot be optimized for reproduction since they must be compatible for use with at least two different image projections or reflections. With the foregoing being the case, the shared components must be compromised to obtain reproductions that can be characterized as acceptable, as opposed to optimal, for each type of reproduction.

In the past when using separate paths to transmit light, from an image to be reproduced, to a single electronic scanning camera, for reproduction of the image, large openings existed in the electronic scanning camera housing to accommodate the necessary lenses, image pickup devices and mirrors. These large openings impacted upon the structural integrity of the housing and allowed debris to enter the housing through said openings. The debris problem and the compromise of structural integrity resulted in poor quality reproductions and frail housings.

SUMMARY OF THE INVENTION

It is an object of the present invention to provide at least two separate and distinct reproduction paths for a single electronic scanning camera without loss of housing structural integrity and without allowing debris to enter and contaminate the electronic scanning camera.

The above object is accomplished by having an electronic scanning camera with multiple lens systems for receiving light images for reproduction. The electronic scanning camera has a housing for retaining at least two lens systems for focusing the received light images onto a common image pick-up device mounted to the housing. The common pick-up device converts said light images into machine readable electronic signals. A movable means contained within the housing has a first position that neither directs nor blocks light images and a second position for directing the light images received from one lens system to the common image pick-up device while blocking light images from other than that lens system from impacting on the common image pick-up device.

The invention, and its objects and advantages will become more apparent in the detailed description of the preferred embodiment presented below.

BRIEF DESCRIPTION OF THE DRAWINGS

FIG. 5 is a perspective view of the relationship between the primary and secondary lens systems, mirror and the charge-coupled device, in accordance with the present invention.

DESCRIPTION OF THE PREFERRED EMBODIMENT

In describing the preferred embodiment of the present invention, reference is made to the drawings, wherein like numerals indicate like parts and structural features in the various views, diagrams and drawings.

Figure 1:
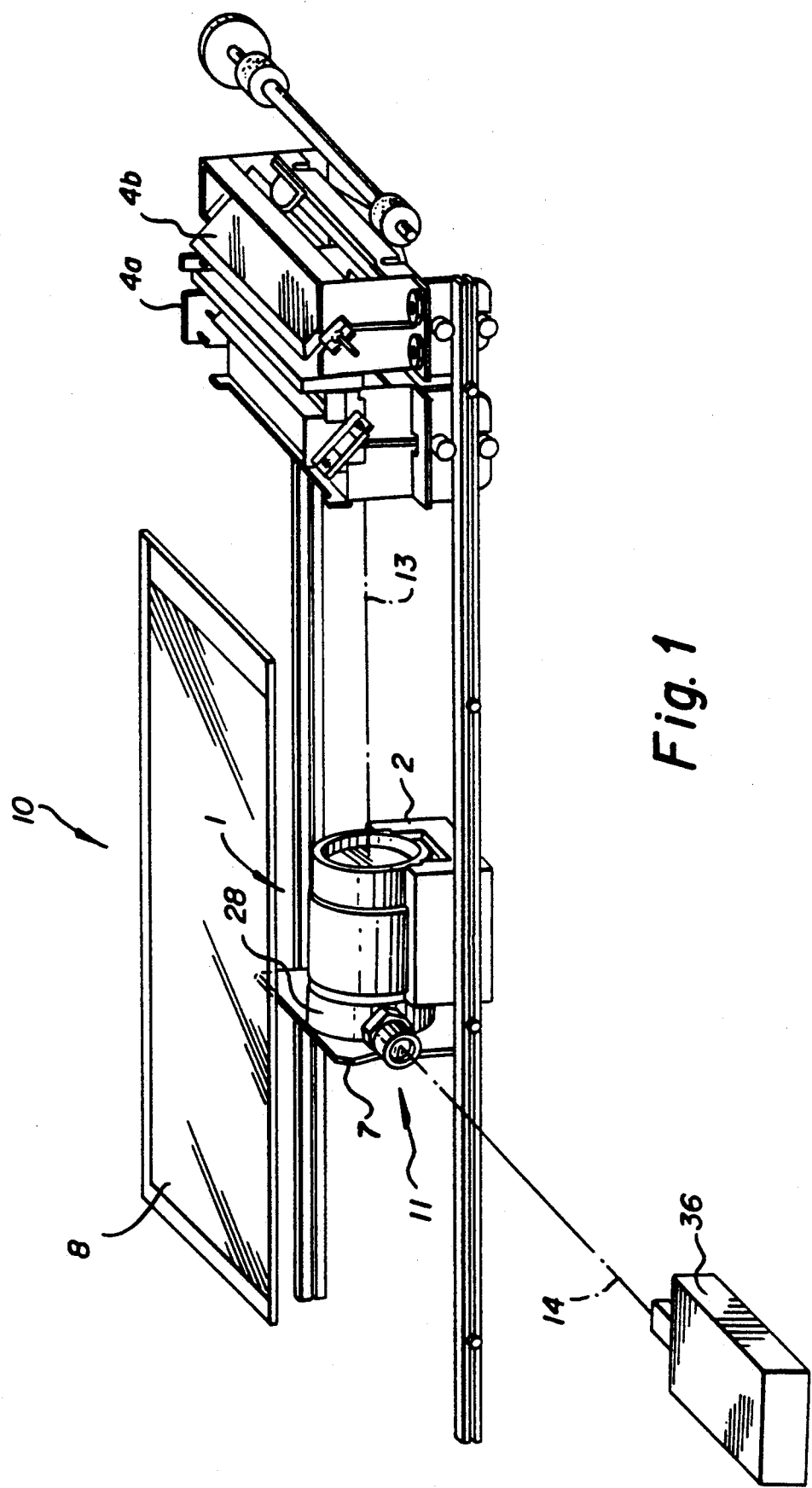
FIG. 1 is a perspective view of the electronic scanning camera, in accordance with the present invention, mounted in its housing.

According to FIG. 1 an electronic scanning camera 1 is mounted in a housing 2 that aligns electronic scanning camera 1 with image informational light paths 13 and 14. Therefore, when an original document is placed upon platen 8 of reproduction station 10, and exposed to a scanning light from exposure station 4a, the scanned light reflected from said original document to mirror assembly 4b, is reflected, in a manner and by means known in the art, along path 13 to lens system 9; see FIG. 3 of electronic scanning camera 1. Lens system 9 then directs the scanned light to a charge-coupled device 6 mounted on a base plate 7 of electronic scanning camera 1. The scanned light of path 14 (see FIG. 1) on the other hand, is scanned light, from a known scanner 36 such as disclosed in Chapter 10 of the Eighth Edition of "Imaging Processes and Materials" by Nebette in which scanner 36 scans a slide or transparency. This scanned light is transmitted to a lens system 11 which directs the light onto a mirror 15, an example of an optical element, and mirror 15 reflects said light to charge-coupled device 6 of electronic scanning camera 1.

Figure 4:
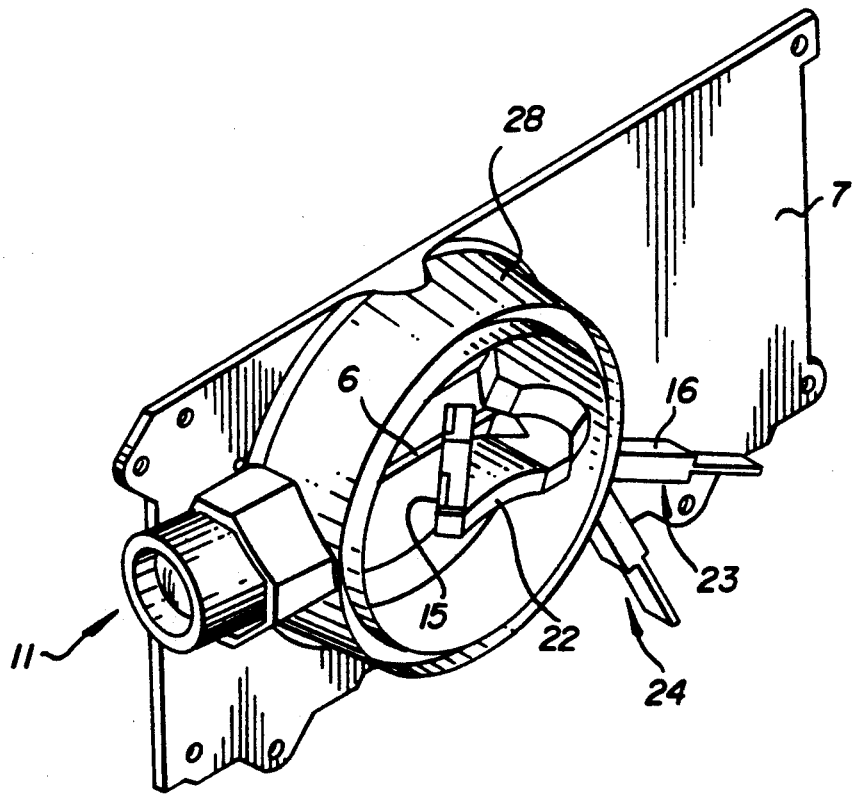
FIG. 4 is a perspective view of the pivotal mirror and mirror mounting arm in accordance with the present invention, as seen from the mounting point for the primary lens system.
Figure 7:
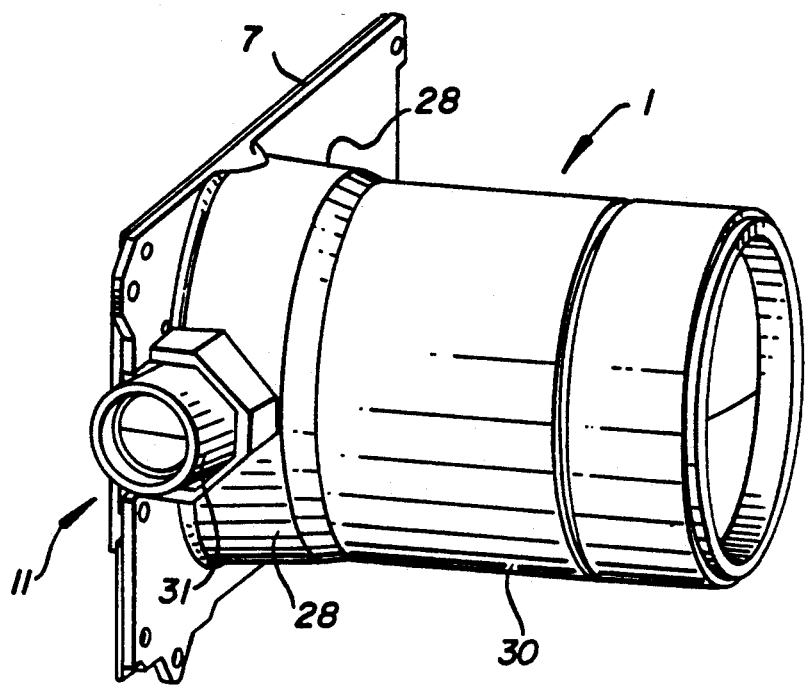
FIG. 7 is a perspective view of the electronic scanning camera in accordance with the present invention.

Mirror 15, within the confines of a mirror housing 28, radially moves into and out of the focal paths of lens systems 11 and 9, of paths 13 and 14; see FIGS. 4 and 5. Mirror 15 is mounted on a pivotal arm 16 for providing the radial motion within mirror housing 28 of electronic scanning camera 1. When pivotal arm 16 is in its normal position 23, it doesn't interfere with the light transmitted through primary lens system 9 for the copying conventional documents. Therefore, if one is unable to move pivotal arm 16 from its normal position, the copying apparatus will still be capable of making reproductions of conventional documents, the primary function of a copying apparatus.

Figure 2:
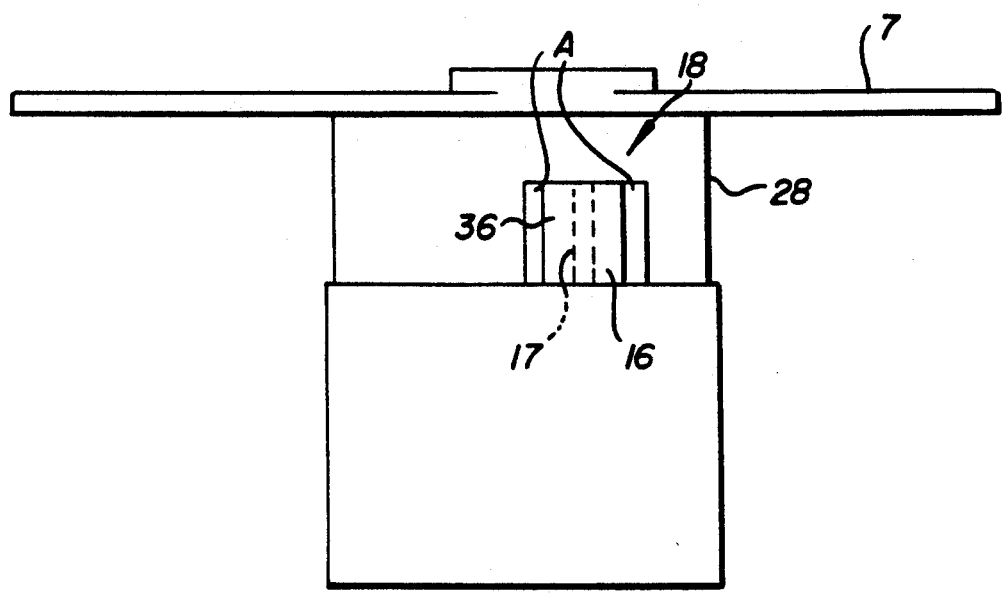
FIG. 2 is a side schematic view of the primary lens housing and mirror housing in accordance with the present invention.

The pivot point of pivotal arm 16 is pivot shaft 17, located integral with mirror housing 28 of electronic scanning camera 1; see FIG. 2. Shaft 17 besides mounting pivotal arm 16 provides support to the walls of an opening 18, of mirror housing 28, in which pivotal arm 16 radially moves. This support is the function of shaft 17 being integral with mirror housing 28, of electronic scanning camera 1, and positioned centrally within opening 18 of mirror housing 28 to reinforce top 36 of opening 18, as hereinafter explained.

Shaft 17 is fully supported by being attached to base plate 7, of electronic scanning camera 1, and mirror housing 28, once base plate 7 is secured to mirror housing 28. In this manner shaft 17 acts as a support column for opening 18 to add structural integrity to mirror housing 28. Therefore, in assembling electronic scanning camera 1, a hole 27 in pivotal arm 16 must be placed over shaft 17 before base plate 7 of electronic scanning camera 1 is secured to mirror housing 28 of electronic scanning camera 1. This accomplishes two purposes. The first is to support opening 18 and maintain the structural integrity of mirror housing 28, and the second is to secure pivot arm 16, in opening 18, while allowing it to freely pivot about shaft 17.

Figure 3:
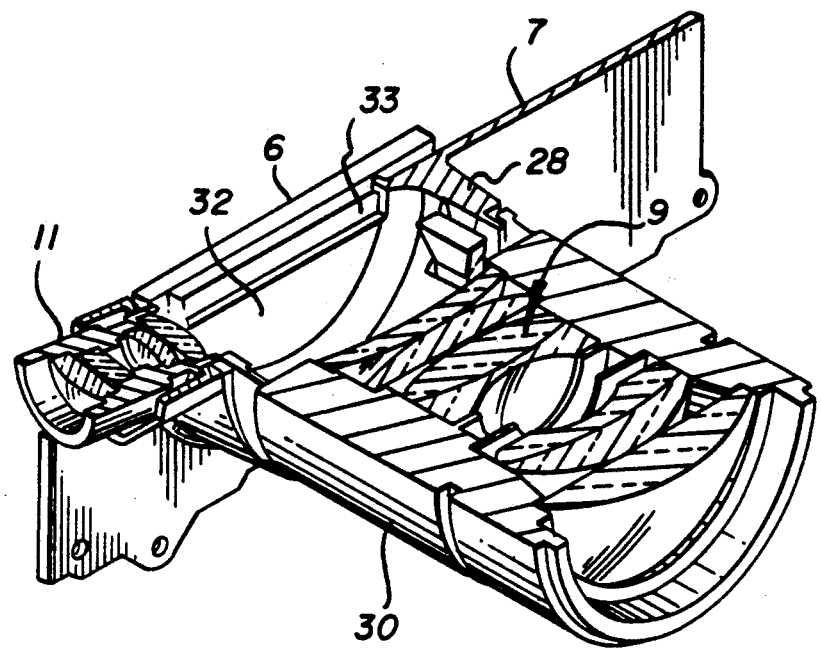
FIG. 3 is a perspective cut away view of the lens of the primary lens system, in accordance with the present invention.
Figure 6:
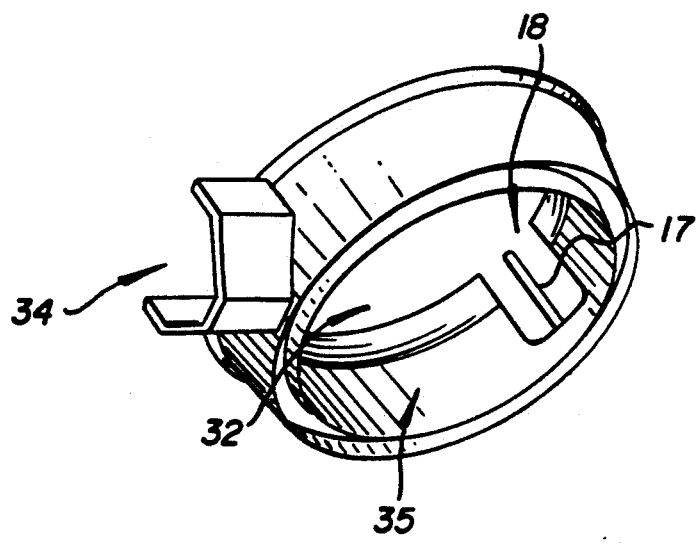
FIG. 6 is a perspective view of the mirror housing and its openings in accordance with the present invention.

Since mirror housing 28 is mounted to base mounting plate 7 and base mounting plate 7 completely encloses opening 32 of mirror housing 28, with the exception of opening 33 through which scanned image light from lens systems 11 and 9 pass through to impact upon charge-coupled device 6, see FIG. 3, no debris can enter electronic scanning camera 1 through opening 32. In addition no debris can enter opening 33 since it is completely covered by charge-coupled device 6. Other openings in electronic scanning camera 1 are openings 34 and 35, but these openings are for the insertion of secondary lens barrel 31 and primary lens barrel 30. Since, however, lens barrels 30 and 31 are mating fits with openings 35 and 34, see FIG. 6, no debris can enter the electronic scanning camera 1 through openings 34 and 35.

Figure 8:
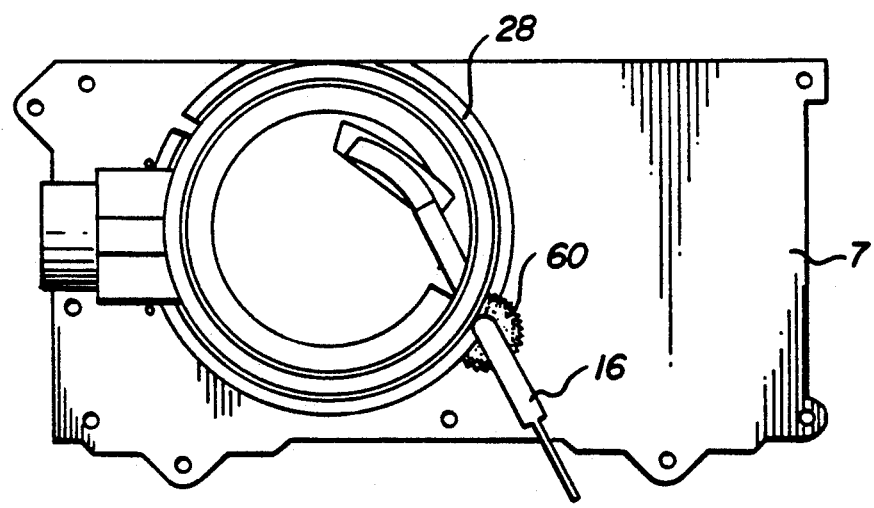
FIG. 8 is a top schematic view of the pivotal arm and boot of the mirror housing in accordance with the present invention.

While opening 18, for pivotal arm 16, is greater than the size of pivotal arm 16, as shown by space A in FIG. 2, to allow pivotal arm 16 to pivot in opening 18, space A is kept to the minimal amount needed for pivotal am 16 to properly move mirror 15. Therefore, by using a boot 60, as shown in FIG. 8, with pivotal arm 16, debris can be kept from entering through opening 18. The electronic scanning camera 1 is therefore closed to the entry of debris and since shaft 17 supports opening 18, lens barrels 30 and 31 completely fill openings 35 and 34, respectively, and base plate 7 supports opening 32, the structural integrity of electronic scanning camera 1 is also assured.

When pivot arm 16 moves mirror 15, within mirror housing 28 of electronic scanning camera 1, into position 24, to receive the image light from path 14, back 22 of pivot arm 16 (see FIG. 4) blocks any light that may be transmitted from path 13. Therefore light from path 13 cannot reach charge-coupled device 6 and interfere with the light transmitted from path 14 to charge-coupled device 6.

Attached to pivotal arm 16 are adjustable stops 25, as shown in FIG. 5, which upon making contact with mirror housing 28 of electronic scanning camera 1, assure that mirror 15 is either out of the light path of lens system 9 of path 13 or properly aligned in light path 14 of lens system 11 to reflect the light from lens system 11 while blocking any light from lens system 9 impacting on charge-coupled device 6. Stops 25 are also adjustable to compensate for any wear and tear of the pivotal mechanism of pivotal arm 16 and, as heretofore mentioned, to provide a means of obtaining optimal mirror positioning.

There is no need to have a blocking device such as back 22 of pivot arm 16 when reproductions from path 13 are being made. This is because any light transmitted from path 14 can't focus upon charge-coupled device 6 unless mirror 15 is in position 24. Therefore, if mirror 15 is in position 23 when scanned light is being transmitted by optical path 13, mirror 15 and its mounting pivot arm 16 are not positioned to transmit that light to charge-coupled device 6 and will not interfere with light transmitted through path 13. Scanned light images received by charge-coupled device 6 from path 13, unlike scanned light images received by charge-coupled device 6 from path 14, are received directly from mirror assembly 4b, through lens system 9 and therefore there is no need for any device such as mirror 15 to redirect the light emerging from lens system 11 of path 13 in order for that light to reach charge-coupled device 6.

In operation, if a scanned image transmitted along path 13, such as from a conventional document, is to be received by charge-coupled device 6, the document is first exposed to the light of exposure station 4a and the light reflected from the original document is received and reflected by mirror assembly 4b along path 13, by means known in the art. This light is then transmitted through lens system 9 which directs said light through an opening 33, see FIG. 3, in mounting plate 7, onto charge-coupled device 6. Opening 33 is formed, in relation to charge-coupled device 6, such that charge coupled device 6 completely covers opening 33, thereby preventing debris from entering the electronic scanning camera 1 through opening 33.

If an image transmitted through path 14, such as from a slide or transparency, is to be received by charge-coupled device 6, a real image of the transparency is scanned, as known in the art, and the scanned image is then transmitted through lens system 11 onto mirror 15 which has been moved, from its normal position outside the optical light path of lens system 9 into its reflective position, in optical light path of lens system 11, by pivoting pivot arm 16 about pivot shaft 17. This pivoting brings mirror 15 into a position 23 where the light emerging from lens system 11 is reflected, by mirror 15, through opening 33, in mounting plate 7, onto charge-coupled device 6.

Charge-coupled device 6, once it receives light images from primary 9 or secondary 11 lens system, converts, as known in the art, the light images into electronic signals that are machine readable by such machines as a recorder, copier, printer, facsimile apparatus, computer terminal or like device.

While the invention has been described in detail with particular reference to a preferred embodiment thereof, it will be understood that variations and modifications can be effected within the spirit and scope of the invention as described hereinabove and as defined in the appended claims.

We claim:

1. An electronic scanning camera adapted to receive light images along two distinct optical paths, said camera comprising:

a multiportion housing, at least two lens elements retained in said housing adapted to focus the received light images, a common image pick-up device mounted to the housing for receiving the focused light images and converting said light images into machine readable electronic signals, and a movable optical element contained within the housing and having a first position removed from said optical paths so as to neither direct nor block said light images and a second position in said optical paths, said movable optical element being adapted in its second position to direct the light images received from one lens element to the common image pick-up device while blocking light images received from an other of said lens elements from impacting on the common image pick-up device.

2. The electronic scanning camera of claim 1 wherein the electronic scanning camera is completely enclosed.

3. The electronic scanning camera of claim 1 wherein the movable optical element includes an arm extending outside the housing for moving the movable optical element within the housing.

4. The electronic scanning camera of claim 3 wherein the housing includes:
   walls defining an opening; and
   a shaft in said opening and adapted to support the walls of said opening, the arm of the movable optical element pivots about said shaft for effecting movement to the movable optical element within the housing.

5. The electronic scanning camera of claim 4 wherein the arm of the movable optical element includes a boot secured to the arm and the housing for completely covering the opening defined by walls.

6. The electronic scanning camera of claim 3 wherein the housing includes an opening for retaining said one lens element, which retained lens element completely fills said opening.

7. The electronic scanning camera of claim 3 wherein the housing includes an opening for retaining said other lens element, which retained lens element completely fills said opening.

8. The electronic scanning camera of claim 3 wherein the camera comprises:
   a mounting means for mounting the electronic scanning camera; and
   an opening in the housing covered by the mounting means and the uncommon image pick-up device.

9. The electronic scanning camera of claim 3 wherein the camera comprises:
   a mounting means for mounting the electronic scanning camera which includes an opening for allowing light images to impact upon the common pick-up device.

10. The electronic scanning camera of claim 9 wherein the opening in the mounting means is completely covered by the common pick-up device.

11. The electronic scanning camera of claim 1 wherein the movable optical element includes a mirror mounted to a non-reflective backing means.

12. The electronic scanning camera of claim 1 wherein the two distinct optical paths between the lens elements and the common image pick-up device are enclosed by the housing, said housing includes two openings, a first opening to retain said one lens element, said one lens element completely filling said first opening, and a second opening to retain said other lens element, said other lens element completely filling said second opening.

13. An electronic scanning camera adapted to receive light images along two distinct optical paths, said camera comprising:
   a multiportion housing;
   at least two stationary lens elements retained in said housing adapted to focus the received light images;
   a common image pick-up device mounted to the housing for receiving the focused light images and converting said light images into machine readable electronic signals; and
   a movable optical element contained within the housing and having a first position removed from said optical paths so as to neither direct nor block said light images and a second position in said optical paths, said movable optical element being adapted in its second position to direct the light images received from one lens element to the common image pick-up device while blocking light images received from an other of said lens elements from impacting on the common image pick-up device, said movable optical element having an arm extending outside the housing for moving the movable optical element within the housing.

* * * * *